United States Patent
Tanada

(10) Patent No.: US 8,570,151 B2
(45) Date of Patent: Oct. 29, 2013

(54) SEMICONDUCTOR DEVICE

(75) Inventor: Yoshifumi Tanada, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1704 days.

(21) Appl. No.: 12/003,702

(22) Filed: Dec. 31, 2007

(65) Prior Publication Data

US 2008/0164978 A1 Jul. 10, 2008

(30) Foreign Application Priority Data

Jan. 10, 2007 (JP) ................................. 2007-002072

(51) Int. Cl.
*H04Q 5/22* (2006.01)
(52) U.S. Cl.
USPC ......................................................... 340/10.1
(58) Field of Classification Search
USPC ............ 340/10.1, 12.51, 505, 14.61; 455/333
See application file for complete search history.

(56) References Cited

U.S. PATENT DOCUMENTS

| | | | |
|---|---|---|---|
| 5,568,441 A | 10/1996 | Sanemitsu | |
| 5,608,614 A * | 3/1997 | Ohnishi et al. | 363/60 |
| 5,956,243 A * | 9/1999 | Mao | 363/61 |
| 6,501,217 B2 * | 12/2002 | Beierlein et al. | 313/504 |
| 6,659,352 B1 | 12/2003 | Asada et al. | |
| 6,940,188 B2 | 9/2005 | Okuma | |
| 7,284,703 B2 | 10/2007 | Powell et al. | |
| 7,535,362 B2 * | 5/2009 | Moser et al. | 340/572.5 |
| 2004/0145454 A1 | 7/2004 | Powell et al. | |
| 2005/0130389 A1 * | 6/2005 | Yamazaki et al. | 438/455 |
| 2006/0209060 A1 | 9/2006 | Tanada et al. | |

FOREIGN PATENT DOCUMENTS

| | | |
|---|---|---|
| EP | 1058376 A | 12/2000 |
| JP | 02-026378A U | 2/1990 |
| JP | 02-193567 A | 7/1990 |
| JP | 2000-242754 A | 9/2000 |
| JP | 2001-125653 A | 5/2001 |
| JP | 2004-088290 A | 3/2004 |
| JP | 2005-316724 | 11/2005 |
| JP | 2006-503376 | 1/2006 |

* cited by examiner

*Primary Examiner* — Vernal Brown
(74) *Attorney, Agent, or Firm* — Eric J. Robinson; Robinson Intellectual Property Law Office, P.C.

(57) ABSTRACT

Provided is a semiconductor device, such as a RFID tag, which receives and transmits data wirelessly and generates electric power using carrier waves, where the semiconductor device is configured to generate a desired power supply voltage even when the power of the carrier waves is insufficient. The semiconductor device comprises a storage capacitor portion formed of a plurality of capacitor portions, where the plurality of capacitor portions are charged in the state of parallel connection, and a high voltage is extracted from part of or all of the plurality of capacitor portions by interconverting the parallel connection to a series connection when a circuit in the semiconductor device is operated. Accordingly, even when the power of carrier waves is reduced a voltage that is necessary for the circuit operation can be assured.

25 Claims, 7 Drawing Sheets

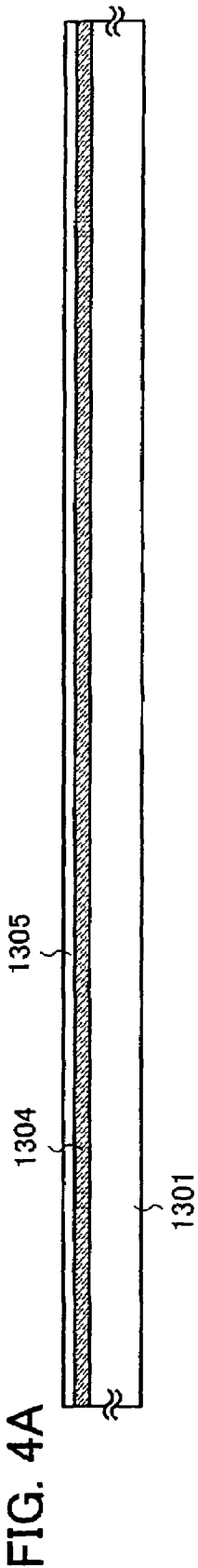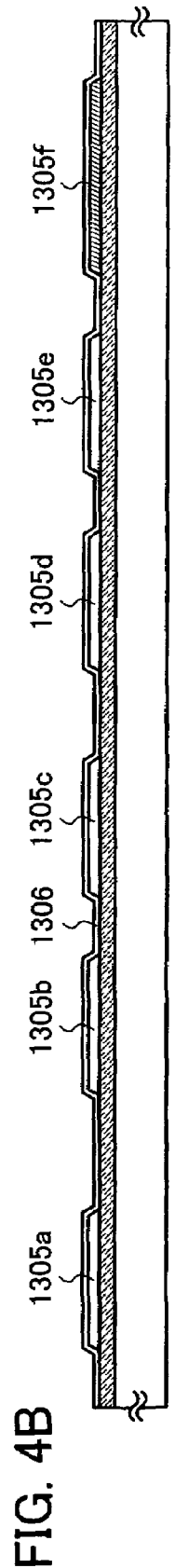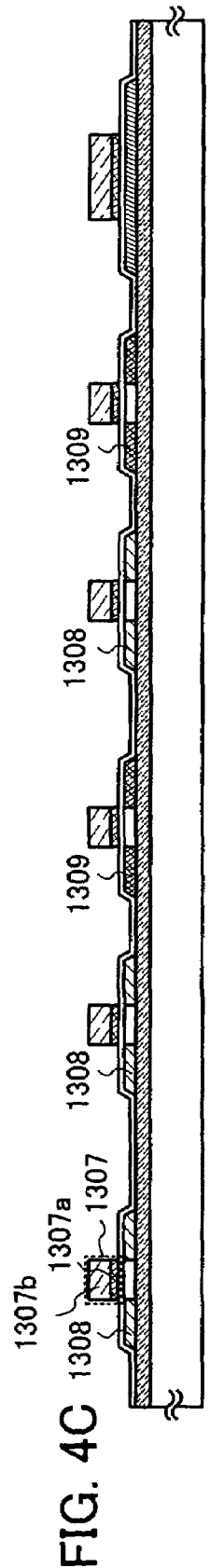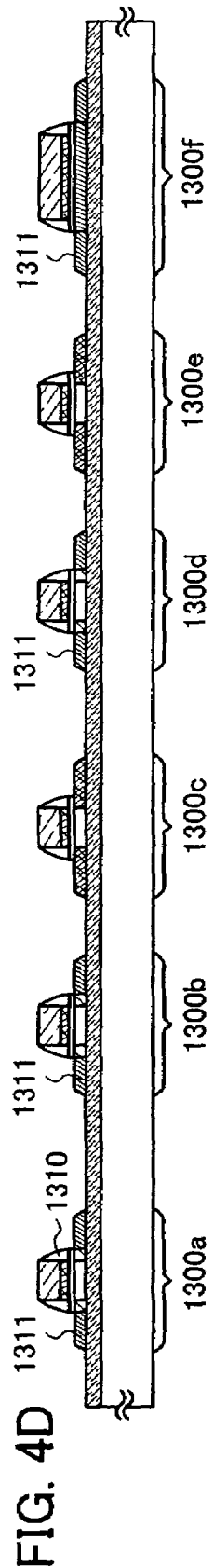

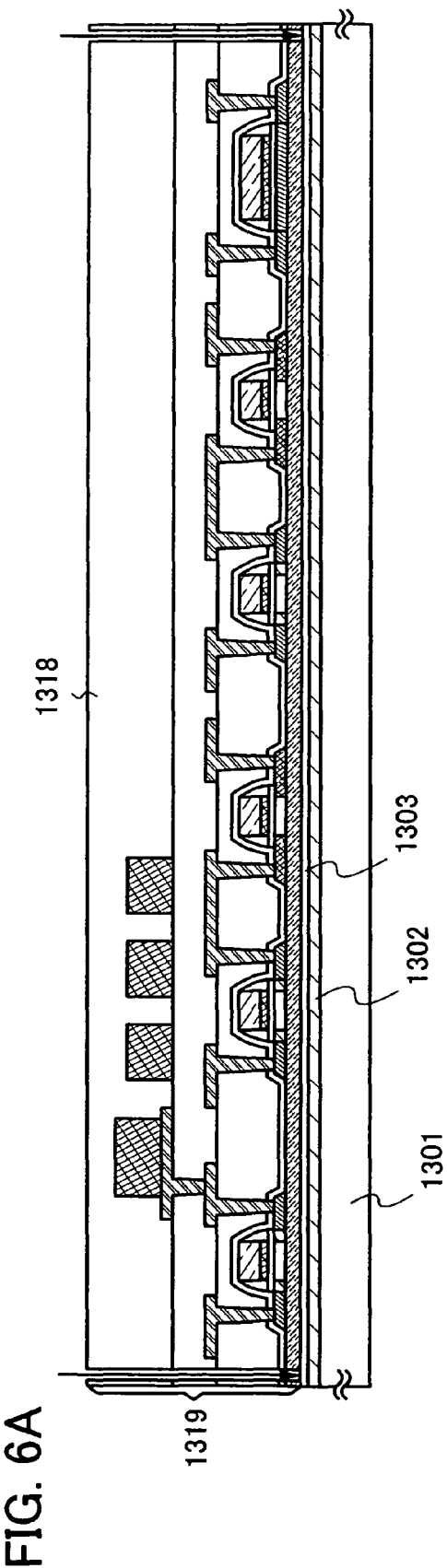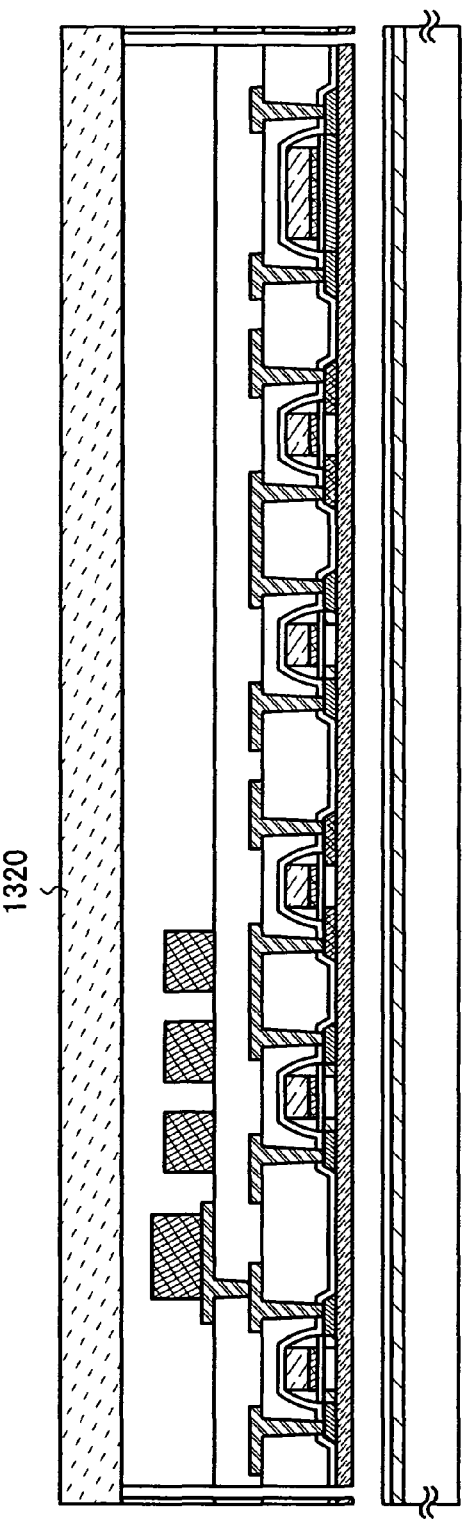
FIG. 6A
FIG. 6B

SEMICONDUCTOR DEVICE

BACKGROUND OF THE INVENTION

1. Field of the Invention

The present invention relates to a semiconductor device that communicates wirelessly.

2. Description of the Related Art

In recent years, an individual identification technique which employs wireless communication with an electromagnetic field, radio waves, or the like has attracted attention. In particular, an individual identification technique which employs an RFID (radio frequency identification) tag as a semiconductor device which communicates data via wireless communication has attracted attention. An RFID tag (hereinafter simply referred as an RFID) is also referred to as an IC (integrated circuit) tag, an IC chip, an RF tag, a wireless tag, and an electronic tag. An individual identification technique which employs an RFID is beginning to be made use of in production, management, and the like of individual objects, and it is expected that this technique will also be applied to individual authentication.

The RFIDs can be divided into two types: an active type RFID tag having a built-in power supply that is necessary for the circuit operation accompanied with reception and transmission data between the tag and a reader/writer, and a passive type RFID tag driven with generating electric power in the tag using electric power of radio waves or electromagnetic waves (carrier waves) from the outside (regarding the active type, see Reference 1: Japanese Published Patent Application No. 2005-316724, and regarding the passive type, see Reference 2: Japanese Translation of PCT International Application No. 2006-503376). The active type RFID has a built-in power supply for driving the RFID, and includes a battery as the power supply. Meanwhile, in the passive type RFID, electric power for driving the RFID is made by using electric power of radio waves or electromagnetic waves (carrier waves) from the outside. Therefore, the passive type RFID has a structure which does not include a battery.

SUMMARY OF THE INVENTION

As shown in FIG. 2, in a passive RFID tag, an antenna 204 in an RFID tag 203 receives alternating carrier waves 202 which is supplied from a reader/writer 201 to generate an AC voltage, the AC voltage is converted into a direct voltage by a rectifier circuit portion 205 to generate electric power, and further, electric charge is stored in a storage capacitor portion 206, so that the electric power serves as the power supply for driving a function portion 207 in the RFID tag 203.

However, there is a problem that when the rectifier circuit portion 205 converts an AC voltage into a DC voltage, not a small loss is caused. In addition, when a high voltage is desired to be obtained in a tag, the received power of carrier waves needs to be heightened, however, the relationship between the received power and the distance between a tag and a reader/writer is trade-off. Further, in the case where the received power of carrier waves are sufficiently high, countermeasures such as the thickening of an insulating film and the like are needed because the transistor included in the rectifier circuit portion 205 is required to have withstand voltage corresponding to the level of the received power. However, in using such a transistor, when the received power of carrier waves is reduced, specifically the distance between the tag and the reader/writer increases, a defect that enough voltage is not generated occurs.

Applications of an RFID tag are not only a tag which is required to conduct reception or transmission in a contact state with a reader/writer because of a security reason like a advanced freight system of railway (such as SUICA (registered trademark)) or the like, but also a tag which is required to have an increased communication distance between the tag and the reader/writer. In order to increase the communication distance, not surprisingly enough voltage for the circuit operation inside the tag should be generated, even if the tag is in the condition that the received power of carrier waves is low.

In view of the foregoing problems, it is an object of the present invention to provide a semiconductor device which can generate desired level of a power supply voltage even when the received power of carrier waves is reduced.

One feature of a semiconductor device of the present invention is to include an antenna which generates an AC voltage by receiving alternating carrier waves, a rectifier circuit which generates a DC voltage from the AC voltage, and a storage capacitor portion which stores the generated DC voltage. The storage capacitor portion includes a plurality of capacitor elements and a plurality of switch means provided between electrodes of the plurality of capacitor elements. On or off of each the plurality of switch is controlled so that switching between a first mode in which all the plurality of capacitor elements are connected in parallel and a second mode in which part or all the plurality of capacitor elements are connected in series is performed.

One feature of a semiconductor device of the present invention is to include an antenna which generates an AC voltage by receiving alternating carrier waves, a rectifier circuit which generates a DC voltage from the AC voltage, a storage capacitor portion which stores the generated DC voltage, and a function portion which conduct processing in response to a command which is included in the received carrier waves. The storage capacitor portion includes a plurality of capacitor elements and a plurality of switch means provided between electrodes of the plurality of capacitor elements. On or off of the plurality of switches means is controlled so that switching between a first mode in which all the plurality of capacitor elements are connected in parallel and a second mode in which part or all the plurality of capacitor elements are connected in series is performed. In a period when an electric charge is accumulated in the storage capacitor portion, the first mode is taken, and in a period when the function portion is driven by the electric charge accumulated in the storage capacitor portion, the second mode is taken.

In the foregoing semiconductor device of the present invention, the rectifier circuit, the storage capacitor portion and the function portion may be formed using a thin film transistor.

One feature of a semiconductor device of the present invention is to include an antenna which generates an AC voltage by receiving alternating carrier waves, a rectifier circuit which generates a DC voltage from the AC voltage, first and second storage capacitor portion which stores the generated DC voltage, first function portion which conducts processing in response to a command which is included in the received carrier waves, and a second function portion requiring a driving voltage higher than that of the first function portion. The second storage capacitor portion includes a plurality of capacitor elements and a plurality of switches means provided between electrodes of the plurality of capacitor element. On or off of the plurality of switches means is controlled so that switching between a first mode in which all the plurality of capacitor elements which the second storage capacitor portion includes are connected in parallel and a second mode in which part or all the plurality of capacitor elements which the second storage capacitor portion includes are connected in series is performed. Electric power obtained from the first storage capacitor portion is used for driving of the first function portion, and electric power obtained by switching the second storage capacitor portion to be in the second mode is used for driving of the second function portion.

In the foregoing semiconductor device of the present invention, the rectifier circuit, the first storage capacitor portion, the second storage capacitor portion, the first function portion, or the second function portion may be formed of a thin film transistor.

Further, in the foregoing semiconductor device of the present invention, a rewritable memory element group or the like may be used for the second function portion.

By a semiconductor device of the present invention, in a storage capacitor portion formed of a plurality of capacitor elements, the plurality of capacitor elements are charged in the state of parallel connection, and at the circuit operation, a high voltage can be taken out by connecting part or all the plurality of capacitor elements in series corresponding to a power supply voltage in need at that time. Accordingly, when the received power of carrier waves is reduced, i.e. even when a distance between a tag and a reader/writer becomes large, a voltage that is necessary for the circuit operation inside the tag can be assured, which greatly contributes to increase of a communication distance.

Additionally, circuit group that requires a high voltage for the operation and could not be incorporated conventionally can be incorporated in the tag, which greatly contributes to high functional of the tag.

BRIEF DESCRIPTION OF THE DRAWINGS

In the accompany drawings:

FIG. 4A to 4D are diagrams illustrating an exemplary manufacturing process of a semiconductor device of the present invention;

FIGS. 6A and 6B are diagrams illustrating an exemplary manufacturing process of a semiconductor device of the present invention.

EMBODIMENT MODE 1

Figure 1A:
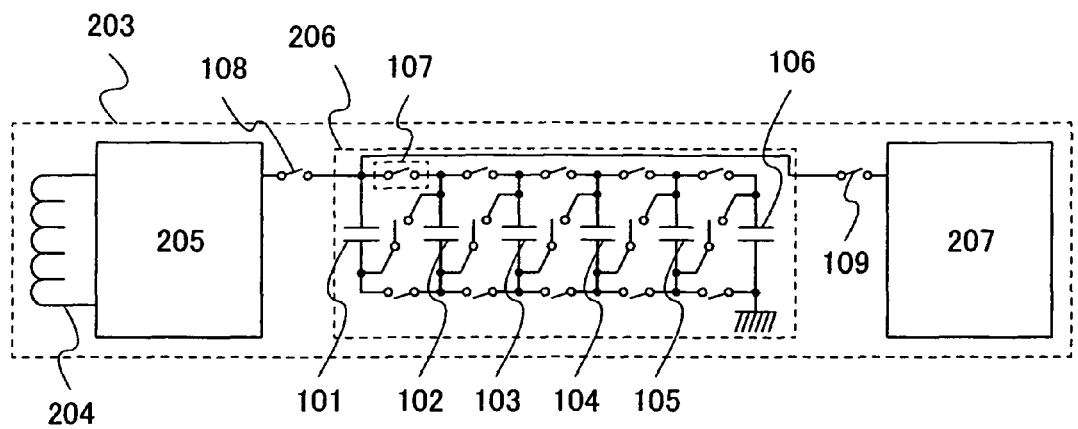
FIGS. 1A to 1C are diagrams illustrating a structure and general operations of a semiconductor device which is one embodiment mode of the present invention.

Embodiment modes of the present invention will be explained hereinafter with reference to the drawings. Note that the present invention is not narrowly limited to the description below, and it is easily understood by those skilled in the art that various changes and modifications can be made in forms and details without departing from the spirit and the scope of the present invention. Accordingly, the present invention should not be construed as being limited to the content of the embodiment modes below. Note that in structures of the present invention to be described below, there are cases where like reference numerals denoting like portions in different drawings are used in common.

The frequency of carrier waves used for transmission or reception between a tag and a reader/writer is 125 kHz, 13.56 MHz, 915 MHz, 2.45 GHz, or the like, which are set by ISO standards or the like. Of course, the frequency of carrier waves transmitted or received between an antenna and a reader/writer is not limited to this, and for example, any of the following frequencies can also be used: 300 GHz to 3 THz, which is a submillimeter wave, 30 GHz to 300 GHz, which is a millimeter wave, 3 GHz to 30 GHz, which is a microwave, 300 MHz to 3 GHz, which is an ultrahigh frequency wave, 30 MHz to 300 MHz, which is a very high frequency wave, 3 MHz to 30 MHz, which is a high frequency wave, 300 kHz to 3 MHz, which is a medium frequency wave, 30 kHz to 300 kHz, which is a low frequency wave, or 3 kHz to 30 kHz, which is a very low frequency wave.

As a method of modulating the carrier waves, analog modulation or digital modulation may be used. Amplitude modulation, phase modulation, frequency modulation, or spread spectrum may also be used. Preferably, amplitude modulation or frequency modulation is used.

There are no limitations, in particular, on the shape of the antenna that can be used in the present invention. Therefore, an electromagnetic coupling method, an electromagnetic induction method, an electromagnetic wave method, an optical method, or the like can be used as a transmission method. The practitioner may select the transmission method, as appropriate, in consideration of the intended use, and an antenna with the most appropriate length and shape for the transmission method may be provided. An electromagnetic wave method can be used for the signal transmission method in the present invention, and further, a microwave method can be used, as well.

In a case where an electromagnetic coupling method or an electromagnetic induction method (for example, 13.56 MHz band) is applied as a transmission method, electromagnetic induction by change of the electric field density is utilized; therefore, a conductive film serving as an antenna is formed into a circular shape (such as a loop antenna) or a spiral shape (such as a spiral antenna).

In a case where a microwave method (for example, UHF band (860 to 960 MHz band), 2.45 GHz band, or the like), which is one of the electromagnetic wave methods, is applied as the transmission method, a length or a shape of a conductive film serving as an antenna may be selected as appropriate in consideration of a wavelength of an electric wave used for signal transmission. For example, the conductive film serving as an antenna can be formed into a linear shape (such as a dipole antenna), a flat shape (such as a patch antenna), or the like. Further, the shape of the conductive film serving as an antenna is not limited to the linear shape, and the conductive film may be formed into a curve shape, a meandering shape, or a combined shape thereof in consideration of a wavelength of an electromagnetic wave.

FIG. 1A shows one embodiment mode of the present invention. Here, an RFID tag is described as a typical example of a semiconductor device of the present invention. This RFID tag 203 includes the antenna 204, the rectifier circuit portion 205, the storage capacitor portion 206, and the function portion 207. The storage capacitor portion 206 is divided into a plurality of capacitor elements 101 to 106. Each switch 107 is provided between electrodes of the capacitor elements 101 to 106. In addition, a switch 108 may be provided between the rectifier circuit portion 205 and the storage capacitor portion 206, and a switch 109 may be provided between the storage capacitor portion 206 and the function portion 207.

On or off of each the switch 107 which is provided between each electrode of the capacitor elements 101 to 106 is controlled to be in an intended state, so that the connection state of the capacitor elements 101 to 106 can be switched. The embodiment is specifically described below.

Figure 1B:
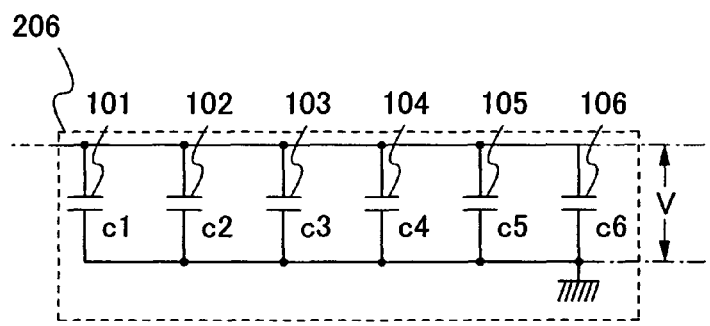

FIG. 1B shows a state that all the capacitor elements 101 to 106 are connected in series. At this time, the capacitor elements 101 to 106 have capacitances c1 to c6 respectively. For simple description, here, the capacitances are assumed to have the following relationship: $c1=c2=c3=c4=c5=c6$. The rectifier circuit rectifies an AC voltage to obtain a DC voltage. At this time, since the capacitor elements 101 to 106 are connected in series, a voltage V is stored in the storage capacitor portion 206 having a total capacitance $C=c1+c2+c3+c4+c5+c6$.

In a state of the capacitor elements 101 to 106 connected in series, the voltage V is used for driving of another circuit, as a DC power supply at discharge.

Figure 1C:
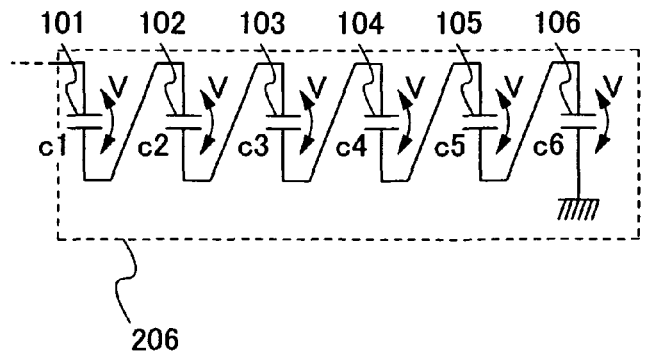

On the other hand, a connection state of the capacitor elements 101 to 106 is changed from the state shown in FIG. 1B to a state shown in FIG. 1C by switching on or off each the switch 107. At this time, the capacitor elements 101 to 106 are connected in series, and the voltage V is stored in each of the capacitor 106 to 109 having capacitances c1, c2, c3, c4, c5, and c6. Therefore, when discharge begins with this state, the voltage V can be used as a DC power supply six times of the voltage V. Of course, since the total amount of charge C does not change from the time of discharge in the state of FIG. 1B, a current value that can be obtained becomes ⅙. Thus, although a period that sufficient voltage is stored for driving a circuit becomes shorter than that of FIG. 1B, driving of a circuit which requires a higher driving voltage becomes possible.

On the other hand, when the received power of carrier waves from a reader/writer, that is, when the rectifier circuit portion 205 can not output a sufficient voltage and the voltage V at the storage capacitor portion 206 is not enough, a sufficient voltage can be obtained for the circuit operation by this method. For example, in the case of an RFID tag or the like, a voltage is only required to be assured when data is received or transmitted; therefore the RFID tag works well even though the period when voltage can be stored is short.

As to controlling the switches 108 and 109, for example in FIG. 1A, there is a method in which a potential of a node which is high potential side of the storage capacitor portion 206 is obtained to be compared using a comparator or the like, and part or all the capacitor elements 101 to 106 are switched to be connected in series when the potential is under a certain potential, or the like. Since the potential of the node which is high potential side of the storage capacitor portion 206 increases by part or all the capacitor elements 101 to 106 being connected in series, a countermeasure, in which a portion obtaining the potential is interrupted so as not to return to the parallel connection immediately, or the like is necessary.

Note that as to the switches 108 and 109, when the capacitor elements 101 to 106 are used in parallel connection regardless in charging or discharging, the switches may always turns on. However, when capacitor elements 101 to 106 are used in series connection in discharging and electric power is needed to be supplied, it is preferable when charging is performed, the switch 108 turns on, and the switch 109 turns off so that the function portion 207 is disconnected, and when discharging is performed, the switch 108 turns off, and the switch 109 turns on so that the rectifier circuit portion 205 is disconnected.

Here, description is made with the assumption each capacitance of the capacitor elements 101 to 106 is equal; however, the present invention is not limited to this. In addition, in this embodiment mode, connections of all the plurality of the capacitor elements 101 to 106 are switched by the switches; however, a structure may be employed, in which only part of the capacitor elements connected in series are used for supplying electric power for a high-voltage driving portion, and the other capacitor elements connected in parallel or a single capacitor element are used for supplying electric power for a low-voltage driving portion.

Additionally, although not shown in FIGS. 1A to 1C, additional storage capacitor portion may be provided in parallel with the storage capacitor portion 206, as a power supply for driving the switches 107, which controls connections of the capacitor elements 101 to 106, and the switches 108 and 109.

EMBODIMENT MODE 2

Figure 3:
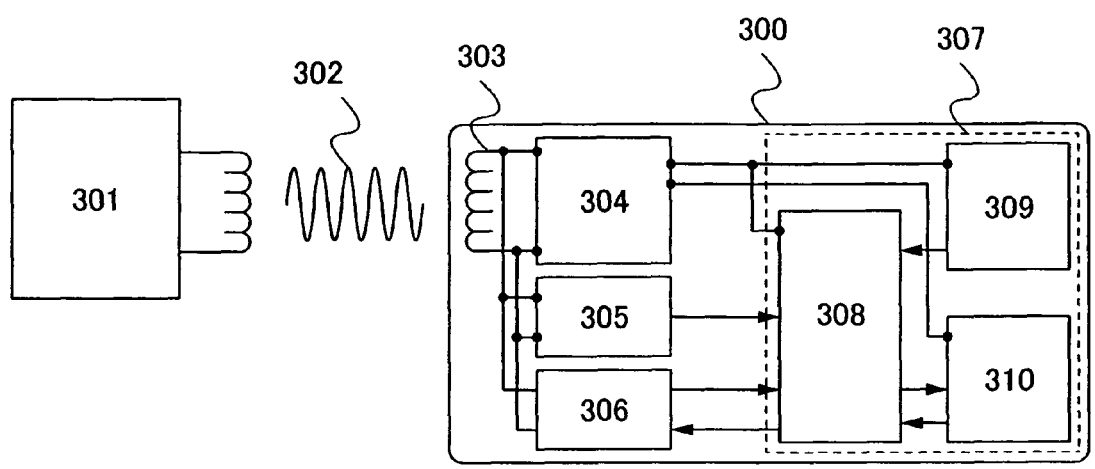
FIG. 3 is a diagram illustrating a structure of a reader/writer and an IC card which use a semiconductor device of one embodiment mode of the present invention.

This embodiment mode will describe an exemplary structure of an IC card using a semiconductor device of the present invention, with reference to FIG. 3.

An IC card 300 having an RFID tag conducts reception and transmission of data between a reader/writer 301 and the IC card 300 using the carrier waves 302 which has a frequency corresponding to various standards. The carrier waves 302 which are output from the reader/writer 301 are input to a resonant circuit 304 which has an antenna 303. The resonant circuit 304 has a rectifier circuit, a storage capacitor, and the like, and a DC voltage is generated from an AC voltage, which is generated by reception of the carrier waves 302, using the rectifier circuit. The storage capacitor smoothes and stores the generated DC voltage.

The AC voltage which is generated by reception of the carrier waves 302 is input to a clock generation circuit 305, and the clock generation circuit 305 generates a clock signal having a desired frequency by frequency dividing or the like, and supplies the clock signal for driving an internal circuit.

In addition, the carrier waves 302 include data, that is sent to the IC card 300, in the state that the amplitude, frequency, or the like of the carrier waves 302 is modulated. The data is demodulated to a digital signal by a modulation/demodulation circuit 306. Additionally, the modulation/demodulation circuit 306 has a function for modulating a digital signal to be output on the carrier waves 302 when the IC card 300 responds to the reader/writer 301.

A dotted frame 307 is a functional circuit portion having a logic circuit 308 which processes a command inside, a mask ROM portion 309 which stores a unique ID of the IC card or the like, and a rewritable memory portion 310 which enables information to be updated.

The rewritable memory portion 310 is preferably a memory, which can write or read information by receiving a command from the reader/writer 301. In addition, the rewritable memory portion 310 is preferably a memory, which can write/erase information electrically like an EEPROM, because nonvolatility for storing information in a period, in which a signal from the reader/writer 301 is not received, is required. Since an EEPROM requires a relatively high power supply voltage in writing, by using the semiconductor device of the present invention, a voltage, which is higher than the usual DC voltage and is obtained by rectifying an AC voltage which is generated by reception of the carrier waves 302 can be obtained, and writing can be achieved.

In this case, as well as Embodiment Mode 1, by control of the switches 108 and 109 illustrated in FIG. 1A, part or all the capacitor elements 101 to 106 in the storage capacitor portion 206 are connected in series, so that high potential is obtained. In this embodiment mode, the switches 108 and 109 may be controlled by using a signal serving as a flag for starting the writing operation to the rewritable memory portion 310.

Figure 2:
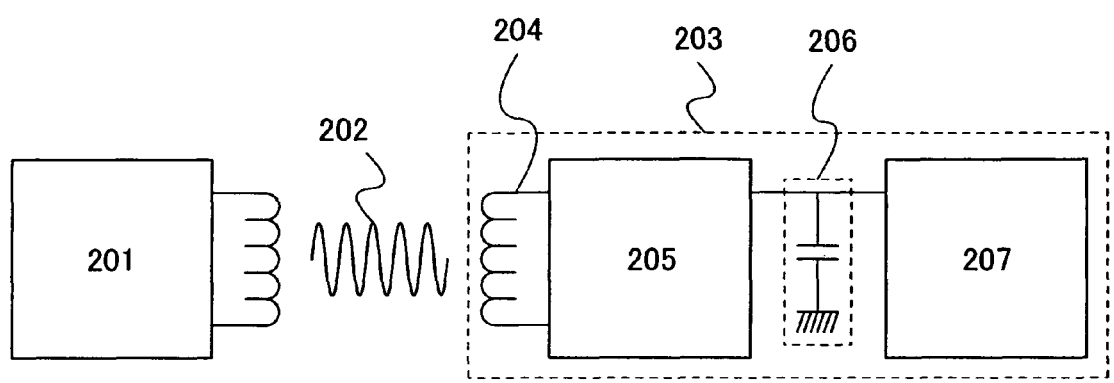
FIG. 2 is a diagram illustrating a structure of an RFID tag and a reader/writer.

On the other hand, in the case where the RFID tag 203 has no portion which requires a higher driving voltage than the peripheral of the function portion does, when the received power of the carrier waves from a reader/writer is reduced, that is, when the rectifier circuit portion 205 shown in FIG. 2 can not output enough voltage, and the storage capacitor portion 206 can not obtain the sufficient voltage V, enough voltage for the circuit operation can be obtained using a semiconductor device of the present invention.

Figure 7:
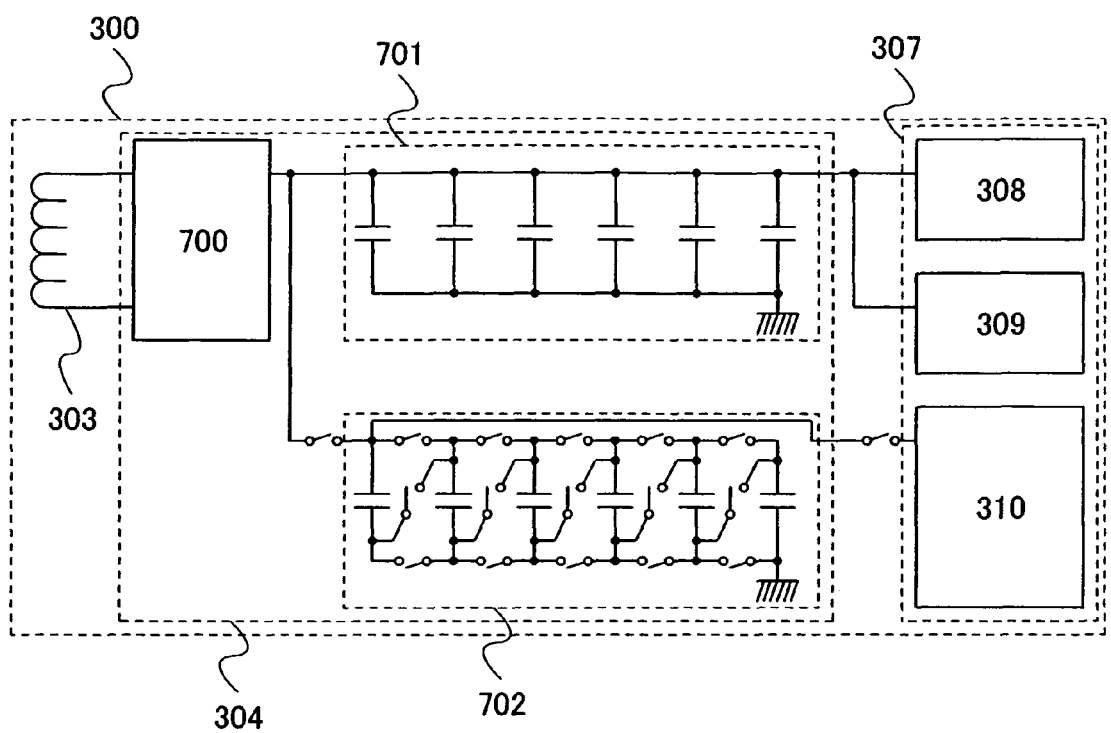
FIG. 7 is a diagram illustrating a structure of a semiconductor device, which is one embodiment mode of the present invention.

Note that for the storage capacitor provided in the resonant circuit 304, as shown in FIG. 7, a first storage capacitor portion 701 that is used only in a state of normal parallel connection and a second storage capacitor portion 702 that can be switched between parallel connection and series connection are mounted separately. After both the storage capacitor portion 701 and 702 are charged by a rectifier circuit 700, with the structure of the storage capacitor portion 701 and 702 being completely separated, the first storage capacitor portion 701 may be used as a power supply for driving of the logic circuit 308 and for readout of the mask ROM portion 309, and the second storage capacitor portion 702 may be used for supplying writing power to the rewritable memory portion 310. The storage capacitor portion 701 and 702 are separated completely, so that driving of the logic circuit 308 and reading of the mask ROM portion 309 can be conducted stably in parallel with writing to the rewritable memory portion 310.

Alternatively, when driving of the logic circuit 308, and reading of the mask ROM portion 309 and the rewritable memory portion 310 are conducted, the plurality of capacitor elements in the second storage capacitor portion 702 in parallel connection is combined with the first storage capacitor portion 701 to supply electric power. When writing to the rewritable memory portion 310 is needed, the plurality of capacitor elements in the second storage capacitor portion 702 is connected in series to ensure and supply a writing voltage, and the first storage capacitor portion 701 in parallel connection may supply electric power for driving of the logic circuit 308 and for readout of the mask ROM portion 309.

EMBODIMENT 1

This embodiment will describe an exemplary manufacture method of a semiconductor device shown in the above embodiment modes, with reference to diagrams. Here, the case is described that elements, included in a circuit such as an analog portion or the like which has a function portion, a rectifier circuit, a power supply circuit, and the like, are provided over one substrate using thin film transistors. Additionally, the case is described that a capacitor element of a thin film transistor type is provided as a power storage element. Of course, a structure provided with a small secondary battery instead of a capacitor element of a thin film transistor type can be employed.

First, an insulating film 1304 serving as a base film and a semiconductor film 1305 (for example, a film containing an amorphous silicon) are stacked and formed over one surface of a substrate 1301 (see FIG. 4A). Note that the insulating film 1304 and the semiconductor film 1305 can be formed consecutively.

The substrate 1301 is selected from a glass substrate, a quartz substrate, a metal substrate such as a stainless steel substrate or the like, a ceramic substrate, a semiconductor substrate such as a Si substrate or the like, a silicon on insulator (SOI) substrate, or the like. Alternatively, as a plastic substrate, a substrate of polyethylene terephthalate (PET), polyethylene naphthalate (PEN), polyether sulfone (PES), acrylic, or the like can be selected.

The insulating film 1304 is formed using an insulating material such as silicon oxide ($SiO_x$), silicon nitride ($SiN_x$), silicon oxynitride ($SiO_xN_y$) (x>y>0), or silicon nitride oxide ($SiN_xO_y$) (x>y>0) by a CVD method, a sputtering method, or the like. For example, when the insulating film 1304 is formed to have a two-layer structure, a silicon nitride oxide film may be formed as a first insulating film and a silicon oxynitride film may be formed as a second insulating film. Alternatively, a silicon nitride film may be formed as a first insulating film and a silicon oxide film may be formed as a second insulating film. The insulating film 1304 serves as a blocking layer, which prevents an impurity element contained in the substrate 1301 from being mixed into elements to be formed over the insulating film 1304. In this manner, provision of the insulating film 1304 which serves as the blocking layer can prevent adverse effects on the elements to be formed over the insulating film 1304, which would be caused by an alkali metal such as Na or an alkaline earth metal contained in the substrate 1301. Note that when quartz is used as the substrate 1301, the insulating film 1304 may be omitted.

The amorphous semiconductor film 1305 is formed with a thickness of 25 to 200 nm (preferably, 30 to 150 nm) by a sputtering method, an LPCVD method, a plasma CVD method, or the like.

Next, the amorphous semiconductor film 1305 is crystallized by laser light irradiation. Note that the crystallization of the amorphous semiconductor film 1305 may also be performed by combining the laser irradiation with a thermal crystallization method using RTA or an annealing furnace, or a thermal crystallization method using a metal element that promotes the crystallization. After that, the crystalline semiconductor film is etched into a desired shape, whereby crystalline semiconductor films 1305a to 1305f are formed. Then, a gate insulating film 1306 is formed so as to cover the semiconductor films 1305a to 1305f (see FIG. 4B).

The gate insulating film 1306 is formed using an insulating material such as silicon oxide, silicon nitride, silicon oxynitride, or silicon nitride oxide by a CVD method, a sputtering method, or the like. For example, when the gate insulating film 1306 is formed to have a two-layer structure, it is preferable to form a silicon oxynitride film as a first insulating film and form a silicon nitride oxide film as a second insulating film. Alternatively, it is also preferable to form a silicon oxide film as a first insulating film and form a silicon nitride film as a second insulating film.

An example of a manufacturing process of the crystalline semiconductor films 1305a to 1305f will be briefly described below. First, an amorphous semiconductor film having a thickness of 50 to 60 nm is formed by a plasma CVD method. Next, a solution containing nickel that is a metal element for promoting crystallization is retained on the amorphous semiconductor film, and dehydrogenation treatment (at 500° C., for one hour) and thermal crystallization treatment (at 550° C., for four hours) are performed on the amorphous semiconductor film; thereby forming a crystalline semiconductor film. After that, the crystalline semiconductor film is irradiated with laser light, and a photolithography method is used, so that the crystalline semiconductor films 1305a to 1305f are formed. Note that without conducting the thermal crystallization using the metal element for promoting crystallization, the amorphous semiconductor film may be crystallized only by laser light irradiation.

As a laser oscillator used for crystallization, either a continuous wave laser beam (a CW laser beam) or a pulsed laser beam can be used. As a laser beam that can be used here is one or more of followings: gas lasers such as an Ar laser, a Kr laser, and an excimer laser; a laser, using as a medium, single-crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ which is doped with one or more of Nd, Yb, Cr, Ti, Ho, Er, Tm, and Ta as a dopant; a glass laser; a ruby laser; an alexandrite laser; a Ti:sapphire laser; a copper vapor laser; and a gold vapor laser. When irradiation is performed with the fundamental wave of such a laser beam or the second to fourth harmonics of the fundamental wave, crystals with a large grain size can be obtained. For example, the second harmonic (532 nm) or the third harmonic (355 nm) of an Nd:YVO$_4$ laser (the fundamental wave of 1064 nm) can be used. In this case, a laser power density of approximately 0.01 to 100 MW/cm$^2$ (preferably, 0.1 to 10 MW/cm$^2$) is needed, and irradiation is performed at a scanning rate of approximately 10 to 2000 cm/sec. It is to be noted that the laser, using as a medium, single-crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ is doped with one or more of Nd, Yb, Cr, Ti, Ho, Er, Tm, and Ta as a dopant; an Ar ion laser; or a Ti:sapphire laser can perform continuous oscillation, whereas it can also be used as pulsed laser at a repetition rate of 10 MHz or more by conducting a Q-switch operation, mode locking, or the like. When a laser beam is oscillated at a repetition rate of 10 MHz or more, a semiconductor film is irradiated with the next pulse during the period in which the semiconductor film is melted by the previous laser and solidified. Therefore, unlike the case of using a pulsed laser with a low repetition rate, a solid-liquid interface in the semiconductor film can be continuously moved. Thus, crystal grains grown continuously in the scanning direction can be obtained.

The gate insulating film 1306 may be formed by oxidation or nitridation of the surfaces of the semiconductor films 1305*a* to 1305*f* by the above-described high-density plasma treatment. For example, plasma treatment with a mixed gas of a rare gas such as He, Ar, Kr, or Xe, and oxygen, nitrogen oxide (NO$_2$), ammonia, nitrogen, hydrogen, or the like is used. When plasma is excited by the introduction of microwaves, plasma with a low electron temperature and high density can be generated. With oxygen radicals (which may include OH radicals) or nitrogen radicals (which may include NH radicals) which are generated by the high-density plasma, the surfaces of the semiconductor films can be oxidized or nitrided.

By such high-density plasma treatment, an insulating film with a thickness of 1 to 20 nm, typically 5 to 10 nm, is formed on the semiconductor films. Since the reaction in this case is a solid-phase reaction, interface state density between the insulating film and the semiconductor films can be quite low. Since such high-density plasma treatment directly oxidizes (or nitrides) the semiconductor films (crystalline silicon or polycrystalline silicon), the insulating film can be formed with extremely little variation in thickness ideally. In addition, since crystal grain boundaries of crystalline silicon are not strongly oxidized, an excellent state is obtained. That is, by the solid-phase oxidation of the surfaces of the semiconductor films by high-density plasma treatment which is described here, an insulating film with a uniform thickness and low interface state density can be formed without excessive oxidation reaction at the crystal grain boundaries.

As the gate insulating film 1306, only an insulating film formed by high-density plasma treatment may be used, or over the insulating film, an insulating film of silicon oxide, silicon oxynitride, silicon nitride, or the like may be deposited by a CVD method using plasma or thermal reaction to form a stacked layer. In either case, transistors which include an insulating film formed by high-density plasma as part or the whole of the gate insulating film can have less characteristic variation.

In addition, the semiconductor films 1305*a* to 1305*f*, which are obtained by irradiation of the semiconductor film 1305 with a continuous wave laser or a laser beam oscillated at a repetition rate of 10 MHz or more and scanning of the semiconductor film in one direction to crystallize the semiconductor film, have a characteristic that crystals grow in the beam scanning direction. A transistor is arranged so that its channel length direction (direction in which carriers move when a channel formation region is formed) is aligned with the scanning direction, and the above-described gate insulating film is combined, whereby a thin film transistor (TFTs) with high electron field effect mobility and few variations in characteristics can be obtained.

Note that in this embodiment, an impurity element is introduced to the semiconductor film 1305*f* in order to use the semiconductor film 1305*f* as an electrode of a capacitor element. Specifically, before or after the formation of the gate insulating film 1306, the semiconductor films 1305*a* to 1305*e* are covered with a resist, and an n-type or p-type impurity element can be selectively introduced to the semiconductor film 1305*f* by an ion doping method or an ion implantation method. As an n-type impurity element, phosphorus (P), arsenic (As), or the like can be used. As a p-type impurity element, boron (B), aluminum (Al), gallium (Ga), or the like can be used. Here, phosphorus (P) is used as an impurity element imparting n-type conductivity and is selectively introduced to the semiconductor film 1305*f*.

Next, a first conductive film and a second conductive film are stacked over the gate insulating film 1306. Here, the first conductive film is formed to have a thickness of 20 to 100 nm by a CVD method, a sputtering method, or the like. The second conductive film is formed to have a thickness of 100 to 400 nm. The first conductive film and the second conductive film are formed of an element selected from tantalum (Ta), tungsten (W), titanium (Ti), molybdenum (Mo), aluminum (Al), copper (Cu), chromium (Cr), niobium (Nb), or the like, or an alloy material or a compound material containing the element as its main component. Alternatively, the first conductive film and the second conductive film are formed of semiconductor materials typified by polycrystalline silicon doped with an impurity element such as phosphorus. As a combination example of the first conductive film and the second conductive film, a tantalum nitride film and a tungsten film; a tungsten nitride film and a tungsten film; a molybdenum nitride film and a molybdenum film; and the like can be given. Tungsten and tantalum nitride have high heat resistance. Therefore, after forming the first conductive film and the second conductive film, thermal treatment for the purpose of heat activation can be applied thereto. In addition, in the case where a two-layer structure is not employed, but a three-layer structure is employed, it is preferable to use a stacked structure of a molybdenum film, an aluminum film, and a molybdenum film.

Next, a mask is formed of a resist using photolithography, and etching treatment for forming gate electrodes and gate lines is conducted. Thus, gate electrodes 1307 are formed over the semiconductor films 1305a to 1305f. Here, a stacked structure of first conductive films 1307a and second conductive films 1307b is shown as an example of the gate electrode 1307.

Next, the semiconductor films 1305a to 1305f are doped with an n-type impurity element at low concentration, by an ion doping method or an ion implantation method using the gate electrodes 1307 as masks. Then, mask formed of a resist is selectively formed by photolithography, and the semiconductor films 1305a to 1305f are doped with a p-type impurity element at high concentration. As an n-type impurity element, phosphorus (P), arsenic (As), or the like can be used. As a p-type impurity element, boron (B), aluminum (Al), gallium (Ga), or the like can be used. Here, phosphorus (P) is used as an n-type impurity element and is selectively introduced into the semiconductor films 1305a to 1305f using the gate electrodes 1307 as masks so as to be contained at concentrations of $1\times10^{15}$ to $1\times10^{19}/cm^3$. Thus, n-type impurity regions 1308 are formed. Then, the semiconductor films 1305a, 1305b, 1305d, and 1305f are covered with a resist, and boron (B) is used as a p-type impurity element and is selectively introduced into the semiconductor films 1305c and 1305e so as to be contained at concentrations of $1\times10^{19}$ to $1\times10^{20}/cm^3$. Thus, n-type impurity regions 1309 are formed (see FIG. 4C).

Subsequently, an insulating film is formed so as to cover the gate insulating film 1306 and the gate electrodes 1307. The insulating film is formed to have either a single layer or a stacked layer of a film containing an inorganic material such as silicon, silicon oxide, or silicon nitride, or a film containing an organic material such as an organic resin by a plasma CVD method, a sputtering method, or the like. Next, the insulating film is selectively etched by anisotropic etching which etches mainly in the perpendicular direction, so that insulating films 1310 (also referred to as sidewalls) which are in contact with the side surfaces of the gate electrodes 1307 are formed. The insulating films 1310 are used as doping masks for forming LDD (lightly Doped Drain) regions.

Next, the semiconductor films 1305a, 1305b, 1305d, and 1305f are doped with an n-type impurity element at high concentrations, using a mask formed of a resist by photolithography method and using the gate electrodes 1307 and the insulating films 1310 as masks. Thus, n-type impurity regions 1311 are formed. Here, phosphorus (P) is used as the n-type impurity element, and is selectively introduced into the semiconductor films 1305a, 1305b, 1305d, and 1305f so as to be contained at concentrations of $1\times10^{19}$ to $1\times10^{20}/cm^3$. Thus, the n-type impurity regions 1311 with higher concentrations of impurity than those of the impurity regions 1308 are formed.

Through the above steps, n-channel transistors 1300a, 1300b, and 1300d; p-channel thin film transistors 1300c and 1300e; and a capacitor element 1300f are formed (see FIG. 4D).

In the n-channel thin film transistor 1300a, a channel formation region is formed in a region of the semiconductor film 1305a, which overlaps with the gate electrode 1307; the impurity regions 1311 which form a source region and a drain region are formed in regions which do not overlap with the gate electrode 1307 and the insulating films 1310; and a low concentration impurity regions (LDD regions) are formed in regions which overlap with the insulating films and between the channel formation region and each of the impurity region 1311. Similarly, channel formation regions, low concentration impurity regions, and the impurity regions 1311 are formed in the n-channel thin film transistors 1300b and 1300d.

In the p-channel thin film transistor 1300c, a channel formation region is formed in a region of the semiconductor film 1305c, which overlaps with the gate electrode 1307; and the impurity regions 1309 which form a source region and a drain region are formed in regions which do not overlap with the gate electrode 1307. Similarly, a channel formation region and the impurity regions 1309 are formed in the p-channel thin film transistor 1300e. Here, although LDD regions are not formed in the p-channel thin film transistors 1300c and 1300e, LDD regions may be provided in the p-channel thin film transistors or a structure without LDD regions may be applied to the n-channel thin film transistors.

Figure 5A:
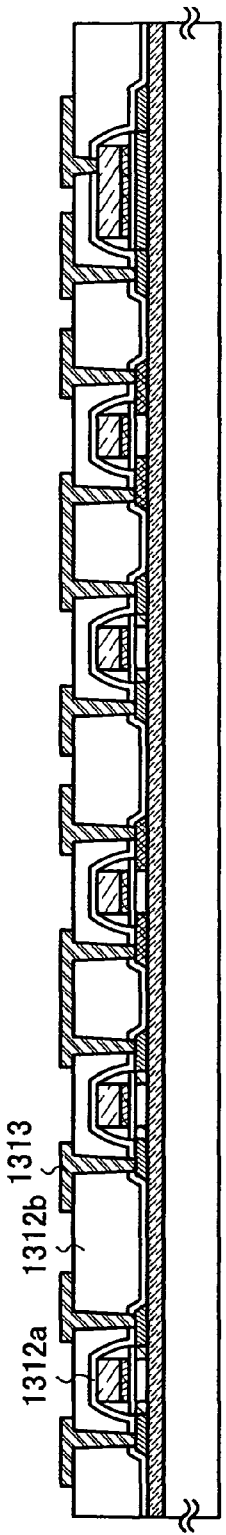
FIGS. 5A and 5B are diagrams illustrating an exemplary manufacturing process of a semiconductor device of the present invention.

Next, an insulating film with a single layer structure or a stacked structure is formed so as to cover the semiconductor films 1305a to 1305f, the gate electrodes 1307, and the like. Then, conductive films 1313 electrically connected to the impurity regions 1309 and 1311 which form the source and drain regions of the thin film transistors 1300a to 1300e, and one electrode of the capacitor element 1300f are formed over the insulating film (see FIG. 5A). The insulating film is formed of a single layer or a stacked layer, using an inorganic material such as silicon oxide or silicon nitride, an organic material such as polyimide, polyamide, benzocyclobutene, acrylic, or epoxy, a siloxane material, or the like by a CVD method, a sputtering method, an SOG method, a droplet discharging method, a screen printing method, or the like. Here, the insulating film is formed to have two layers, and a silicon nitride oxide film is formed as a first insulating film 1312a and a silicon oxynitride film is formed as a second insulating film 1312b. In addition, the conductive films 1313 can form the source and drain electrodes of the thin film transistors 1300a to 1300e. Note that a siloxane material corresponds to a material having a Si—O—Si bond. Siloxane has a skeletal structure formed of bonds of silicon (Si) and oxygen (O). As a substituent, an organic group containing at least hydrogen (for example, an alkyl group or aromatic hydrocarbon) is used. A fluoro group can also be used as a substituent. Alternatively, an organic group containing at least hydrogen and a fluoro group may be used as a substituent.

It is to be noted that before the insulating films 1312a and 1312b are formed or after one or a plurality of them is/are formed, heat treatment is preferably applied in order to recover the crystallinity of the semiconductor films, to activate the impurity element which has been added into the semiconductor films, or to hydrogenate the semiconductor films. As the heat treatment, thermal annealing, laser annealing, RTA, or the like is preferably applied.

The conductive films 1313 are formed of a single layer or a stacked layer of an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), or silicon (Si), or an alloy material or a compound material containing the element as its main component. An alloy material containing aluminum as its main component corresponds to, for example, a material which contains aluminum as its main component and also contains nickel, or a material which contains aluminum as its main component and also contains nickel and one or both of carbon and silicon. The conductive films 1313 are preferably formed to have a stacked structure of a barrier film, an aluminum-silicon film, and a barrier film or a stacked structure of a barrier film, an aluminum silicon film, a titanium nitride film, and a barrier film. It is to be noted that the "barrier film" corresponds to a thin film formed of titanium, titanium nitride, molybdenum, or molybdenum nitride. Aluminum and aluminum silicon are the most suitable material for forming the conductive films 1313 because they have low resistance value and are inexpensive. When barrier layers are provided as the top layer and the bottom layer, generation of hillocks of aluminum or aluminum silicon can be prevented. In addition, when a barrier film formed of titanium which is an element having a high reducing property is formed, even when there is a thin natural oxide film formed on the crystalline semiconductor film, the natural oxide film can be chemically reduced, and a favorable contact with the crystalline semiconductor film can be obtained.

Next, an insulating film 1314 is formed so as to cover the conductive films 1313, and a conductive film 1316 that is electrically connected to the conductive films 1313 which form the source electrode or the drain electrode of the thin film transistor 1300a is formed over the insulating film 1314. The conductive film 1316 may be formed using any of the above-described materials which have been described for the conductive films 1313.

Figure 5B:
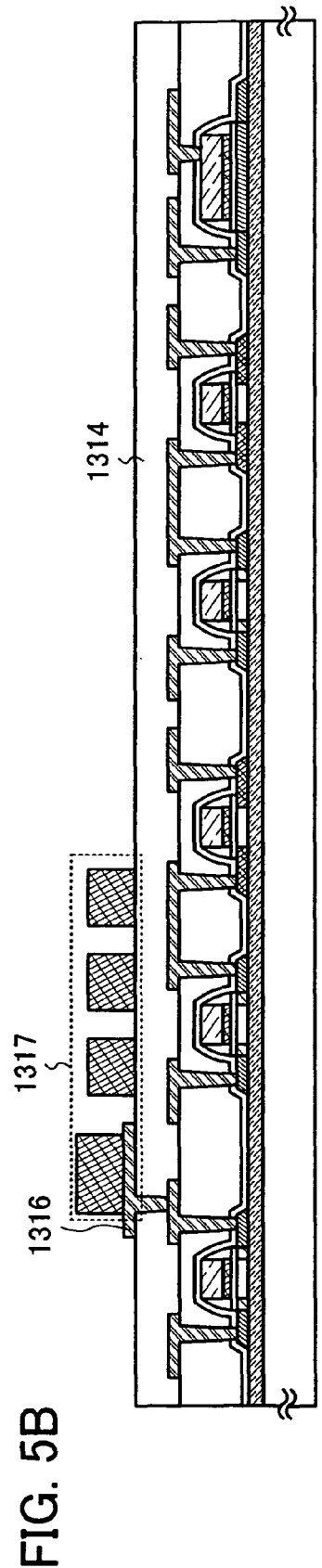

Next, a conductive film 1317 functioning as an antenna is formed so as to be electrically connected to the conductive film 1316 (see FIG. 5B).

The insulating film 1314 can be formed of a single layer or a stacked layer of an insulating film, containing oxygen or nitrogen, of silicon oxide, silicon nitride, silicon oxynitride, silicon nitride oxide, or the like; a film containing carbon such as DLC (Diamond-Like Carbon); an organic material such as epoxy, polyimide, polyamide, polyvinyl phenol, benzocyclobutene, or acrylic; or a siloxane material such as a siloxane resin.

The conductive film 1317 can be formed of a conductive material by a CVD method, a sputtering method, a printing method such as screen printing or gravure printing, a droplet discharging method, a dispenser method, a plating method, or the like. The conductive film 1317 is formed of a single layer or a stacked layer of an element selected from aluminum (Al), titanium (Ti), silver (Ag), copper (Cu), gold (Au), platinum (Pt), nickel (Ni), palladium (Pd), tantalum (Ta), or molybdenum (Mo), or an alloy material or a compound material containing the element as its main component.

For example, when the conductive film 1317 functioning as an antenna is formed by a screen printing method, the antenna can be provided by selective printing of a conductive paste in which conductive particles with a grain diameter of several nm to several tens of µm are dissolved or dispersed in an organic resin. The conductive particles can be at least one or more of metal particles selected from silver (Ag), gold (Ag), copper (Cu), nickel (Ni), platinum (Pt), palladium (Pd), tantalum (Ta), molybdenum (Mo), titanium (Ti), or the like; fine particles of silver halide; and dispersive nanoparticles. In addition, the organic resin included in the conductive paste can be one or more of organic resins which function as a binder, a solvent, a dispersing agent, or a coating material of the metal particles. Typically, an organic resin such as an epoxy resin and a silicone resin can be given. In addition, it is preferable to form the conductive film by the steps of providing a conductive paste and baking it. For example, in the case of using fine particles (e.g., a grain diameter of 1 to 100 nm) containing silver as its main component as a material of the conductive paste, the conductive paste is baked and hardened at temperatures in the range of 150 to 300° C. so that the conductive film can be obtained. Alternatively, it is also possible to use fine particles containing solder or lead-free solder as its main component. In that case, fine particles with a grain diameter of less than or equal to 20 µm are preferably used. Solder and lead-free solder have the advantage of low cost.

In addition, in this embodiment, an antenna is formed of conductive film 1317 directly over the insulating film 1314 by patterning or screen printing after the film formation; however, the antenna may be formed over another substrate such as the substrate described above, a plastic substrate which is flexible, or the like and may be connected and attached so as to be electrically connected to the conductive film 1316.

Finally, the substrate is cut by dicing in a desired shape and size, so that a semiconductor device can be completed.

Note that in the semiconductor device shown in this embodiment, the structure of a transistor can have various modes. The structure of a transistor is not limited to the particular structure shown in this embodiment. For example, a multi-gate structure provided with two or more gate electrodes may be used. With the multi-gate structure, channel regions are connected in series. Thus, a structure is obtained, in which a plurality of transistors are connected in series. By employing the multi-gate structure, an off current can be reduced, reliability can be enhanced by improving a withstand voltage of the transistor, flat characteristics can be obtained, in which a drain-source current is not changed so much even if a drain-source voltage is changed when the transistor is operated in a saturation region, and so on. Alternatively, a structure may be employed, in which gate electrodes are arranged above and below a channel. By employing the structure where gate electrodes are arranged above and below a channel, a channel region is increased; therefore, a current value can be increased and a subthreshold swing can be improved because a depletion layer is easily generated. When gate electrodes are arranged above and below a channel, a structure is obtained, in which a plurality of transistors are connected in parallel.

Further alternatively, the following structure may be employed: a structure where a gate electrode is arranged above a channel, a structure where a gate electrode is arranged below a channel, a staggered structure, or an inversely staggered structure. A channel region may be divided into a plurality of regions, and the plurality of channel regions may be connected to each other in parallel or in series. Further, a source electrode or a drain electrode may be overlapped with a channel (or part thereof). By employing the structure where a source electrode or a drain electrode is overlapped with a channel (or part thereof), instability of an operation due to electric charge accumulation in part of a channel can be prevented. In addition, an LDD region may be provided. By providing the LDD region, an off current can be reduced, reliability can be enhanced by improving a withstand voltage of the transistor, and flat characteristics can be obtained, in which a drain-source current is not changed so much even if a drain-source voltage is changed when the transistor is operated in a saturation region.

Note that the transistors which can be used in the present invention includes a transistor formed using single crystalline silicon, a transistor using SOI, and the like, in addition to a thin film transistor using a polycrystalline semiconductor, a microcrystalline semiconductor, or an amorphous semiconductor. Alternatively, a transistor using an organic semiconductor, or a transistor using a carbon nanotube may be used.

Note that a manufacture method shown in this embodiment can be applied to semiconductor devices of any of the embodiment modes, which are described in this specification.

EMBODIMENT 2

This embodiment will describe the case in which elements such as thin film transistors and the like are transferred to a flexible substrate, after the elements are formed over a supporting substrate in accordance with the process of Embodiment 1.

As shown FIG. 6A, a separation layer 1303 is formed over the substrate 1301 with an insulating film 1302 interposed therebetween. Then, an element group such as thin film transistors is formed over the substrate 1301 in accordance with the process of Embodiment 1.

The insulating film 1302 is formed using an insulating material such as silicon oxide ($SiO_x$), silicon nitride ($SiN_x$), silicon oxynitride ($SiO_xN_y$) (x>y>0), or silicon nitride oxide ($SiN_xO_y$) (x>y>0) by a CVD method, a sputtering method, or the like. The insulating film 1302 functions as a blocking layer which prevents an impurity element contained in the substrate 1301 from being mixed into the separation layer 1303 or elements to be formed thereover. In this manner, provision of the insulating film 1302 which functions as the blocking layer can prevent adverse effects on the elements to be formed over the separation layer 1303, cased by an alkali metal such as Na or an alkaline earth metal contained in the substrate 1301. It is to be noted that when quartz is used for the substrate 1301, the insulating film 1302 may be omitted.

The separation layer 1303 can be formed using a metal film, a stacked structure of a metal film and a metal oxide film, or the like. As the metal film, either a single layer or stacked layers are formed using an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), or iridium (Ir), or an alloy material or a compound material containing the element as its main component. In addition, such materials can be formed by a sputtering method, various CVD methods such as a plasma CVD method, or the like. A stacked structure of a metal film and a metal oxide film can be obtained by the steps of forming the above-described metal film, and conducting plasma treatment thereto under an oxygen atmosphere or an $N_2O$ atmosphere or conducting heat treatment thereto under an oxygen atmosphere or an $N_2O$ atmosphere, thereby forming oxide or oxynitride of the metal film on the surface of the metal film. For example, when a tungsten film is provided as a metal film by a sputtering method, a CVD method, or the like, a metal oxide film formed of tungsten oxide can be formed on the surface of the tungsten film by conducting of plasma treatment to the tungsten film. In that case, the tungsten oxide can be represented by $WO_x$, where x is in the range of 2 to 3. For example, there are cases where x is 2 ($WO_2$), x is 2.5 ($W_2O_5$), x is 2.75 ($W_4O_{11}$), x is 3 ($WO_3$), and the like. When forming tungsten oxide, there is no particular limitation on the value of x, and thus, which of the above oxides is to be formed may be determined base on the etching rate of the like. In addition, after a metal film (e.g., tungsten) is formed, an insulating film formed of silicon oxide or the like may be formed over the metal film by a sputtering method, and also metal oxide (e.g., tungsten oxide over tungsten) may be formed over the metal film.

Next, after forming an insulating film 1318 so as to cover the conductive film 1317, layers including the thin film transistors 1300a to 1300e, the capacitor element 1300f, the conductive film 1317, and the like (hereinafter referred to as an "element formation layer 1319") are peeled off the substrate 1301. Here, after forming openings in a portion of the element formation layer 1319, where the thin film transistors 1300a to 1300e and the capacitor element 1300f are not included, by laser light irradiation (e.g., UV light) (see FIG. 6A), the element formation layer 1319 can be peeled off the substrate 1301 with a physical force. Note that element formation layer 1319 can be peeled off with a liquid such as water so as to prevent the thin film transistors provided in the element formation layer 1319 from being broken by static electricity.

Further, the substrate 1301 that is peeled off the element formation layer 1319, the cost can be reduced.

The insulating film 1318 can be formed of a single layer or a stacked layer of an insulating film, containing oxygen or nitrogen, of silicon oxide, silicon nitride, silicon oxynitride, silicon nitride oxide, or the like; a film containing carbon such as DLC (Diamond-Like Carbon); an organic material such as epoxy, polyimide, polyamide, polyvinyl phenol, benzocyclobutene, or acrylic; or a siloxane material such as a siloxane resin by a CVD method, a sputtering method, or the like.

In this embodiment, after forming the openings in the element formation layer 1319 by laser light irradiation, a first sheet material 1320 is attached to one surface of the element formation layer 1319 (the surface where the insulating film 1318 is exposed), and then the element formation layer 1319 is peeled off the substrate 1301 (see FIG. 6B).

After that, it is preferable that a second sheet material (not shown) is attached to a separation layer (the surface exposed by peeling), and then, one or both of heat treatment and pressure treatment is performed to attach the second sheet material to the separation layer. As the first sheet material and the second sheet material, a hot-melt film or the like can be used.

Additionally, a film to which antistatic treatment for preventing static electricity or the like has been subjected (hereinafter referred to as an antistatic film) can be used. As examples of the antistatic film, a film in which an antistatic material is dispersed in a resin, a film to which an antistatic material is attached, and the like can be given. The film provided with an antistatic material can be a film with an antistatic material provided over one of its surfaces, or a film with an antistatic material provided over both of its surfaces. The film with an antistatic material provided over one of its surfaces may be attached to the layer so that the surface provided with the antistatic material is placed on the inner side of the film or the outer side of the film. The antistatic material may be provided over the entire surface of the film, or over part of the film. As an antistatic material, a metal, indium tin oxide (ITO), or a surfactant such as an amphoteric surfactant, a cationic surfactant, or a nonionic surfactant can be used. In addition, as an antistatic material, a resin material which contains a cross-linked copolymer having a carboxyl group and a quaternary ammonium base on its side chain, or the like can be used. Such a material can be attached, mixed, or applied to a film, so that an antistatic film can be formed. By sealing with the antistatic film the semiconductor elements can be suppressed from adverse effects such as external static electricity when dealt with as a commercial product.

Although a circuit can be formed over an insulating substrate using a thin film transistor using a manufacturing process shown in Embodiment 1 or this embodiment, a thin film transistor in general tends to have lower mobility and large variation in threshold voltage because crystalline state of a thin film transistor is inferior to that of a transistor formed over a single crystal substrate or a transistor formed over an SOI substrate. Thus, as described above, when the AC voltage which is generated by reception of the carrier waves is rectified so as to ensure a power supply for driving an internal circuit, loss of the internal electric power generated from the received power becomes large. Therefore, by employing the present invention, even a circuit formed using a thin film transistor can generate a high voltage easily with reduced loss.

Note that the manufacturing process of a semiconductor device shown in this embodiment can be applied to semiconductor devices of other embodiment modes and an embodiment which are described in this specification.

This application is based on Japanese Patent Application serial No. 2007-002072 filed with Japan Patent Office on Jan. 10, 2007, the entire contents of which are hereby incorporated by reference.

What is claimed is:

1. A semiconductor device comprising:
an antenna configured to generate an AC voltage from carrier waves;
a rectifier circuit configured to generate and output a DC voltage from the AC voltage;
a function portion configured to conduct processing in response to a command included in the carrier waves; and
a storage capacitor portion configured to store the DC voltage output from the rectifier circuit, the storage capacitor portion comprising:
a first terminal connected to the rectifier circuit and to the function portion;
a second terminal;
first to n-th capacitor elements; and
a plurality of switches,
wherein the plurality of switches are configured to connect the first to n-th capacitor elements in parallel between the first terminal and the second terminal, in a first mode,
wherein the plurality of switches are configured to connect the first to m-th capacitor elements in series between the first terminal and the second terminal, in a second mode,
wherein n is natural number larger than 1,
wherein m is natural number larger than 1 and smaller than or equal to n,
wherein a potential of the second terminal is fixed, and
wherein a switch is connected between the first terminal and the rectifier circuit.

2. The semiconductor device according to claim 1, further comprising:
a substrate having an insulating surface,
wherein the rectifier circuit comprises a thin film transistor over the substrate.

3. The semiconductor device according to claim 1, further comprising:
a substrate having an insulating surface,
wherein the storage capacitor portion comprises a thin film transistor over the substrate.

4. The semiconductor device according to claim 1, further comprising:
a substrate having an insulating surface,
wherein the antenna is formed over the substrate.

5. The semiconductor device according to claim 1,
wherein the function portion comprises a rewritable memory element group, and
wherein the plurality of switches are configured to enter the second mode when a data included in the carrier waves is written in the rewritable memory element group.

6. A semiconductor device comprising:
an antenna configured to generate an AC voltage from carrier waves;
a rectifier circuit configured to generate and output a DC voltage from the AC voltage;
a function portion configured to conduct processing in response to a command included in the carrier waves; and
a storage capacitor portion configured to store the DC voltage output from the rectifier circuit, the storage capacitor portion comprising:
a first terminal connected to the rectifier circuit and to the function portion;
a second terminal;
first to n-th capacitor elements; and
a plurality of switches,
wherein the plurality of switches are configured to connect the first to n-th capacitor elements in parallel between the first terminal and the second terminal, in a first mode,
wherein the plurality of switches are configured to connect the first to n-th capacitor elements in series between the first terminal and the second terminal, in a second mode,
wherein n is natural number larger than 1,
wherein a potential of the second terminal is fixed, and
wherein a switch is connected between the first terminal and the rectifier circuit.

7. The semiconductor device according to claim 6, further comprising:
a substrate having an insulating surface,
wherein the rectifier circuit comprises a thin film transistor over the substrate.

8. The semiconductor device according to claim 6, further comprising:
a substrate having an insulating surface,
wherein the storage capacitor portion comprises a thin film transistor over the substrate.

9. The semiconductor device according to claim 6, further comprising:
a substrate having an insulating surface,
wherein the antenna is formed over the substrate.

10. The semiconductor device according to claim 6,
wherein the function portion comprises a rewritable memory element group, and
wherein the plurality of switches are configured to enter the second mode when a data included in the carrier waves is written in the rewritable memory element group.

11. A semiconductor device comprising:
an antenna configured to generate an AC voltage from carrier waves;
a rectifier circuit configured to generate and output a DC voltage from the AC voltage;
a first function portion configured to conduct first processing in response to a first command included in the carrier waves;
a second function portion configured to conduct second processing in response to a second command included in the carrier waves;
a first storage capacitor portion configured to store the DC voltage output from the rectifier circuit, the first storage capacitor portion comprising:
a first terminal connected to the rectifier circuit and to the first function portion;
a second terminal;
first to n-th capacitor elements; and
a plurality of switches, and
a second storage capacitor portion configured to store the DC voltage;
wherein the plurality of switches are configured to connect the first to n-th capacitor elements in parallel between the first terminal and the second terminal, in a first mode,
wherein the plurality of switches are configured to connect the first to m-th capacitor elements in series between the first terminal and the second terminal, in a second mode,
wherein the second storage capacitor portion is connected between the rectifier circuit and the second function portion,
wherein n is natural number larger than 1,
wherein m is natural number larger than 1 and smaller than or equal to n,
wherein a potential of the second terminal is fixed, and wherein a switch is connected between the first terminal and the rectifier circuit.

12. The semiconductor device according to claim 11, further comprising:
a substrate having an insulating surface,
wherein the rectifier circuit comprises a thin film transistor over the substrate.

13. The semiconductor device according to claim 11, further comprising:
a substrate having an insulating surface,
wherein at least one of the first storage capacitor portion and the second storage capacitor portion comprises a thin film transistor over the substrate.

14. The semiconductor device according to claim 11, further comprising:
a substrate having an insulating surface,
wherein the antenna is formed over the substrate.

15. The semiconductor device according to claim 11,
wherein the first function portion comprises a rewritable memory element group, and
wherein the plurality of switches are configured to enter the second mode when a data included in the carrier waves is written in the rewritable memory element group.

16. A semiconductor device comprising:
an antenna configured to generate an AC voltage from carrier waves;
a rectifier circuit configured to generate and output a DC voltage from the AC voltage;
a first function portion configured to conduct first processing in response to a first command included in the carrier waves;
a second function portion configured to conduct second processing in response to a second command included in the carrier waves;
a first storage capacitor portion configured to store the DC voltage output from the rectifier circuit, the first storage capacitor portion comprising:
a first terminal connected to the rectifier circuit and to the first function portion;
a second terminal;
first to n-th capacitor elements; and
a plurality of switches, and
a second storage capacitor portion configured to store the DC voltage;
wherein the plurality of switches are configured to connect the first to n-th capacitor elements in parallel between the first terminal and the second terminal, in a first mode,
wherein the plurality of switches are configured to connect the first to n-th capacitor elements in series between the first terminal and the second terminal, in a second mode,
wherein the second storage capacitor portion is connected between the rectifier circuit and the second function portion,
wherein n is natural number larger than 1,
wherein a potential of the second terminal is fixed, and
wherein a switch is connected between the first terminal and the rectifier circuit.

17. The semiconductor device according to claim 16, further comprising:
a substrate having an insulating surface,
wherein the rectifier circuit comprises a thin film transistor over the substrate.

18. The semiconductor device according to claim 16, further comprising:
a substrate having an insulating surface,
wherein at least one of the first storage capacitor portion and the second storage capacitor portion comprises a thin film transistor over the substrate.

19. The semiconductor device according to claim 16, further comprising:
a substrate having an insulating surface,
wherein the antenna is formed over the substrate.

20. The semiconductor device according to claim 16,
wherein the first function portion comprises a rewritable memory element group, and
wherein the plurality of switches are configured to enter the second mode when a data included in the carrier waves is written in the rewritable memory element group.

21. A semiconductor device comprising:
an antenna configured to generate an AC voltage from carrier waves;
a rectifier circuit configured to generate and output a DC voltage from the AC voltage;
a first function portion configured to conduct first processing in response to a first command included in the carrier waves;
a second function portion configured to conduct second processing in response to a second command included in the carrier waves;
a first storage capacitor portion configured to store the DC voltage output from the rectifier circuit, the first storage capacitor portion comprising:
a first terminal connected to the rectifier circuit and to the first function portion;
a second terminal;
first to n-th capacitor elements; and
a plurality of switches, and
a second storage capacitor portion configured to store the DC voltage, the second storage capacitor portion comprising:
a third terminal connected to the rectifier circuit and to the second function portion;
a fourth terminal; and
plurality of capacitor elements connected in parallel between the third terminal and the fourth terminal;
wherein the plurality of switches are configured to connect the first to n-th capacitor elements in parallel between the first terminal and the second terminal, in a first mode,
wherein the plurality of switches are configured to connect the first to m-th capacitor elements in series between the first terminal and the second terminal, in a second mode,
wherein n is natural number larger than 1,
wherein m is natural number larger than 1 and smaller than or equal to n,
wherein a potential of the second terminal is fixed, and
wherein a switch is connected between the first terminal and the rectifier circuit.

22. The semiconductor device according to claim 21, further comprising:
a substrate having an insulating surface,
wherein the rectifier circuit comprises a thin film transistor over the substrate.

23. The semiconductor device according to claim 21, further comprising:
a substrate having an insulating surface,
wherein at least one of the first storage capacitor portion and the second storage capacitor portion comprises a thin film transistor over the substrate.

24. The semiconductor device according to claim 21, further comprising:
a substrate having an insulating surface,
wherein the antenna is formed over the substrate.

25. The semiconductor device according to claim 21,
wherein the first function portion comprises a rewritable memory element group, and
wherein the plurality of switches are configured to enter the second mode when a data included in the carrier waves is written in the rewritable memory element group.

* * * * *